United States Patent
Douris et al.

[11] Patent Number: 6,155,705
[45] Date of Patent: Dec. 5, 2000

[54] EXTRUDER SCREW WITH COATINGS OF DIFFERENT HARDNESSES THEREON

[75] Inventors: Christian Douris, Maringues; Jean-Louis Hebuterne, Cournon-d'Auvergne, both of France

[73] Assignee: Compagnie Générale des Etablissements Michelin - Michelin & Cie, Clermont-Ferrand Cedex, France

[21] Appl. No.: 09/215,567

[22] Filed: Dec. 17, 1998

[30] Foreign Application Priority Data

Dec. 22, 1997 [FR] France .................................. 97 16558

[51] Int. Cl.$^7$ ...................................................... B29B 7/80
[52] U.S. Cl. ............................................. 366/79; 198/676
[58] Field of Search ........................... 366/67, 79, 83–85, 366/318; 198/657, 676; 100/145, 146; 425/204, 208, 209

[56] References Cited

U.S. PATENT DOCUMENTS

| | | | |
|---|---|---|---|
| 3,592,128 | 7/1971 | French ..................................... | 100/145 |
| 3,968,533 | 7/1976 | Zentner . | |
| 3,998,318 | 12/1976 | McAlarney ............................ | 425/208 |
| 4,003,115 | 1/1977 | Fisher . | |
| 4,223,601 | 9/1980 | Knuth et al. ............................ | 198/676 |
| 4,440,076 | 4/1984 | Mansfield ................................ | 100/145 |
| 4,449,967 | 5/1984 | Caldwell ................................... | 494/54 |
| 4,838,700 | 6/1989 | Williamson ............................... | 366/318 |
| 4,949,836 | 8/1990 | Schostek .................................. | 198/676 |
| 4,996,919 | 3/1991 | Mansfield .................................. | 425/208 |
| 5,088,397 | 2/1992 | Mansfield et al. ....................... | 100/145 |
| 5,156,860 | 10/1992 | Kojima et al. ............................ | 366/79 |
| 5,348,453 | 9/1994 | Baran et al. . | |
| 5,429,581 | 7/1995 | Michaud et al. .......................... | 494/54 |
| 5,673,618 | 10/1997 | Little ........................................ | 100/145 |

FOREIGN PATENT DOCUMENTS

| | | | |
|---|---|---|---|
| 0070689 | 1/1983 | European Pat. Off. . | |
| 78453 | 5/1983 | European Pat. Off. ................. | 366/79 |
| 200117 | 11/1986 | European Pat. Off. ................. | 366/79 |
| 3730782 | 2/1989 | Germany .................................. | 366/79 |
| 60-153927 | 8/1985 | Japan ....................................... | 366/318 |
| 61-245829 | 11/1986 | Japan ....................................... | 366/318 |
| 61-266209 | 11/1986 | Japan ....................................... | 366/79 |
| WO9532831 | 12/1995 | WIPO . | |

*Primary Examiner*—Charles E. Cooley
*Attorney, Agent, or Firm*—Baker Botts L.L.P.

[57] ABSTRACT

An extruder screw having at least one raised part forming a thread projecting on a core intended to be rotatably mounted inside an extruder roll in which the raised part includes a crown wall and side walls intersecting with the crown wall, the intersections between each of the side walls and the crown wall forming edges intended to cut the material, the crown wall of said raised part being provided with a coating of at least two materials of different hardnesses placed side by side on the crown wall.

7 Claims, 1 Drawing Sheet

EXTRUDER SCREW WITH COATINGS OF DIFFERENT HARDNESSES THEREON

SPECIFICATION

BACKGROUND OF THE INVENTION

The invention concerns the equipment for mixing and/or plasticizing by mechanical work and the equipment for extrusion of different materials, such as rubber. This invention concerns, in particular, a coating process ensuring protection against wear by contact friction between at least one rotating piece and one stationary piece. It also concerns an extruder screw provided with this coating on at least some of its raised parts.

The threads of the mixing and extrusion screws are, in particular, concerns of the invention, as are the raised parts of the extrusion heads in proximity to the ejection openings of the plasticized material, said parts having the function of ejecting said material.

The area of application of the invention is not solely reserved for rubber, but can be easily extended to plastics and elastomeric compositions or to any material capable of being mixed and extruded after having undergone more or less extensive mechanical work.

In the field of preparation of rubber mixtures, extruders consisting of a metal mixing roll are used, in which at least one metal screw formed by a core surrounded by one or more threads of appropriate shape is rotated.

Thread is understood to mean any raised part on the core, intended mix/shear the base material(s) in order to be able to extrude the mixture obtained through a die of given profile.

The material to be plasticized is introduced in the mixing roll of said machine and undergoes mechanical deformation work (mainly shearing) by the rotation of each internal screw; the dimensions of each screw and of each thread depend on the work necessary for plasticization; the greater that work, the longer the screw in relation to the diameter of its core. Under the action of rotation of the screw, the material tends to present considerable mechanical resistance, which entails more or less substantial bending strains of the core, said core then being able to come in contact with the inner wall of the roll. This contact results in wear of the crown parts of the screw threads, that is, the parts of the threads situated closest to and opposite the inner wall of the mixing roll. The same phenomenon occurs on the raised parts of the extrusion heads intended to push the plasticized material out of the extruder.

This problem of wear of the screw threads is well known and, in order to increase the lifetime of moving pieces that might rub against stationary parts, while maintaining a low cost, the use of extruder screws has been proposed, in which the crown parts of the threads are provided with a metal alloy-base coating, the wear characteristic of which is improved over that of the base material constituting the thread. Alloys called Stellite 6 or Stellite 12 are employed, for example, the hardness and wear characteristics of which make it possible to improve the lifetime of extruder screws appreciably.

A known process of coating consists of making an alloy deposition by welding; a finishing operation is necessary and consists of grinding of the thread surfaces in order to obtain the surface state and dimensions desired. It is to be noted that, taking into account the elevated hardness of the coating, that machining necessitates specific tools and, consequently, the grinding operation is thereby rendered more difficult.

Experience has shown that the deposition of a material of maximum hardness is preferable from the standpoint of wear; however, coatings of elevated hardness, which are very effective on wear, present the disadvantage of being fragile when subjected to mechanical shear stresses like those encountered, for example, in extruders. A so-called scaling phenomenon occurs, consisting of the fact that the surface of the coating of elevated hardness cracks in a plane roughly parallel to the surface on which the stress acts. A scaling is progressively formed in the coating, followed by the tearing away of fragments from said coating; fragment is understood to mean pieces of material of substantially greater size than the size of the particles usually formed by regular wear. Following that weakening of the deposit of elevated hardness, fragments torn away from the coating might be found in the material mixed, which results in the presence of relatively large-sized foreign bodies that can affect the performance of the aforesaid extruded materials on future use. One consequence of such scaling phenomenon is that it is necessary, in order to avoid the presence of deposition fragments in the extruded material, to provide a system of monitoring of the surface state of the threads; said monitoring operation entails, of course, extra costs. Furthermore, the coated pieces need to be renovated rather frequently; restoration or renovation of the deposit is an operation which is certainly practical, but remains, nevertheless, difficult to apply with coating materials of elevated hardness.

SUMMARY OF THE INVENTION

According to one aspect of the invention, a process is proposed for coating a crown wall of at least one raised part on the outer wall of a core turning inside a hollow roll barrel having an inner wall opposite the said outer wall of said core. The crown wall is situated as close as possible to the hollow roll barrel, by comparison with the other points of the outer wall surface of the core, and is limited by side walls, the intersection of each of said side walls with said crown wall forming an edge intended to cut (that is, to shear) a material that can be plasticized by mechanical work.

The process of coating of the crown parts according to the invention, endowing said part with endurance properties improved over those usually obtained with the known processes, entails the following stages:

- a first material of hardness D1 is deposited on and in proximity to at least one edge of the crown part of each raised part to be coated and on only a fraction of the width of said crown part;
- a second material of hardness D2 is deposited on the rest of the uncoated crown part, said hardness D2 being greater than hardness D1;
- the depositions made in the preceding stages are ground in order to obtain the profile and the dimensions of each raised part on the core.

The width of the crown part is defined as the dimension measured in a direction parallel to the axis of rotation of the piece to be coated.

The process according to the invention applies to the fabrication of new pieces as well as to the renovation of mixing and/or extruder pieces after wear following use.

The deposition of material of hardness less than that of the other material can be carried out either before or after deposition of the other material. The material deposited on and in proximity to at least one edge is a metal material obtained, for example, by depositing a weld bead.

In order to obtain optimum performance, it is advantageous for the second material of hardness D2 comprising the coating to be a material chosen among nickel-base metal materials of elevated hardness or among ceramic materials of elevated hardness.

The invention also concerns an extruder screw containing at least one raised part projecting on a core planned to be mounted rotating inside an extruder roll and intended for the work of mixing a material that can be plasticized as well as for the properly so-called extrusion of said material. The raised part contains a crown wall limited by side walls, the intersection between each of said side walls and said crown wall forming an edge intended to cut the material during the plasticization work; said raised part is so placed that its crown part is situated as close as possible to the extruder roll by comparison with the other points of the surface of the outer wall of the core.

In addition, the crown part of at least one raised part on the core is provided with a coating intended to improve appreciably the lifetime of said raised part by increasing its wear resistance. That coating of the crown walls is characterized in that it is composed of at least two materials placed side by side on said crown wall, said materials having different hardnesses D1 and D2, the regions of the crown part undergoing elevated shear stresses preferably being coated with a material of lesser hardness.

The coating material situated on and in proximity to each edge formed by the intersection of a crown part of a raised part and of a side wall of said raised part advantageously has a hardness less than that of the coating material or materials not covering the edges.

The coating material on and in proximity to the edge of the crown part, carrying out the work of shearing the material to be plasticized and/or to be extruded, preferably has a hardness D1 at least 5 HRc less than the hardness D2 of the coating material covering the rest of said crown part.

The coating obtained by the process according to the invention makes it possible to improve the friction abrasion resistance appreciably, while reducing the appearance of the scaling phenomenon of the usual coatings.

One advantage of the coating according to the invention is that it makes it possible to widen the possibilities of choice of covering materials, since it is then possible to use very hard materials in zones presenting little risk of scaling, which materials can be chosen, for example, among nickel-base materials or among ceramic materials.

Variants of this invention, which should be considered only as examples helping in understanding of the invention, are described below with the aid of the drawing accompanying this specification.

DESCRIPTION OF PREFERRED EMBODIMENTS

Figure 1:
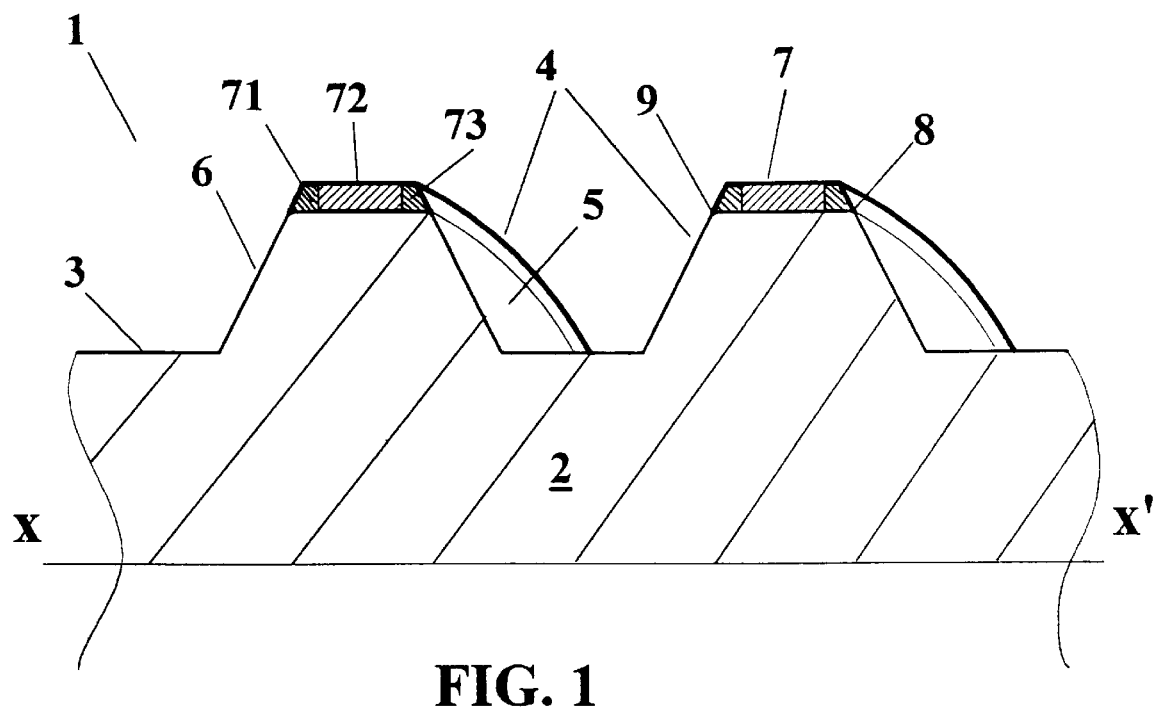
FIG. 1 shows a schematic section of an extruder screw containing a thread coated on its crown part with a coating according to the invention.

Only one part of an extruder screw 1 according to the invention is represented in FIG. 1, where said screw 1 consists of a metal core 2 having the shape of an elongated cylinder of axis XX' and containing on its outer wall 3 a thread 4 helically wound around the same axis XX'.

The thread 4 is defined on the outer wall 3 of the core 2 by two side walls 5 and 6 and by a crown part 7 situated between said two side walls 5 and 6. In the example presented in FIG. 1, the crown part 7 of the thread 4 is cylindrical and concentric to the outer wall 3 of the core 2; and the crown will 7 is intended, once the screw 1 is in place in the mixing barrel of an extruder, to be situated as close as possible to the inner wall of said mixing barrel (not represented here).

In order to increase the useful life of the thread 4 of said screw 1, the crown part 7, which is approximately 15 mm wide, is provided with a coating layer nearly 1.5 mm thick, said layer according to the invention being formed, seen in the direction of axis XX', by three parts placed side by side in the XX' direction. A first part 71 and a third part 73, both consisting of a metal alloy of hardness D1, cover the crown wall 7 of the thread 4 in proximity to the two edges 8 and 9 determined respectively by the intersection of the side walls 5 and 6 of the thread 4 with said crown part 7; a second part 72 composed of a second metal alloy of hardness D2, D2 being significantly greater than D1 in the example presented, covers the part of the crown wall 7 situated between the edges 8 and 9 and not covered by the first part 71 and the third part 73 in order to form the coating.

An extruder screw 1 is thus obtained, containing a thread 4 provided with an effective coating against contact wear and against the scaling phenomenon under the strong shear stresses resulting from the work of mixing and/or extrusion of the materials to be extruded.

The difference in hardness is preferably at least 5 HRc. In order to obtain a coating ensuring effective and durable protection, coating thicknesses ranging from 0.5 mm to 4 mm are used.

In a variant of the example presented, the coating materials are nickel-base alloys (advantageous from the standpoint of characteristics of welding and malleability and, therefore, of shaping) and present hardnesses, for the parts close to the edges, at most equal to 52 HRc (measured on the Rockwell scale), while for the intermediate part of the coating the alloy chosen has a hardness close to 62 HRc.

In another advantageous variant of the example presented, the use is proposed of nickel-base metal alloys filled with tungsten in proportions that can range from 30 to 60%, in order to make a composite material presenting improved resistance to wear through the presence of tungsten filler of very great hardness (exceeding 70 HRc); a tungsten-filled alloy will preferably be placed at least on the intermediate part of the coating.

Another interesting coating variant consists of using, for at least the intermediate part of said coating, a ceramic type material known for its characteristics of elevated hardness and low coefficient of friction; this arrangement also affords the possibility, with low wear rate preserved, of an appreciable reduction of thickness of said coating.

The measures previously described are transposable to any piece containing parts subject to more or less rapid wear and necessitating the use of a coating making it possible to retard said wear, without thereby being limited in the choice of coating material, at least for a portion of the wall surfaces to be covered.

Figure 2:
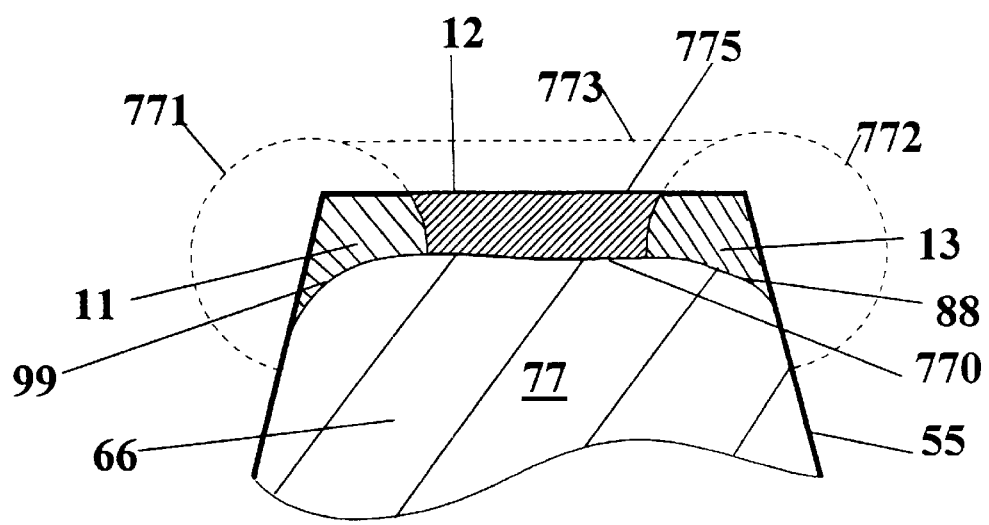
FIG. 2 shows a section of a thread of an extruder screw in the course of renovation according to the process of the invention.

In FIG. 2, only one part of a thread 77 of an extruder screw is shown in cross section along a plane containing the axis of rotation of the screw bearing said thread. The thread 77 of FIG. 2 corresponds to a thread on which the different stages of the process are shown superposed to facilitate understanding of the process.

The curve 770 corresponds to the contour of the crown part of the thread 77 after wear of said thread necessitating a renovation of said crown part. In this worn form, the thread is previously examined to verify the absence of any crack before possibly undergoing a slight grinding by machining of the crown surface of said thread prior to application of the stages of the process according to the invention as follows:

- a first bead 11 and a second bead 13 of a metal alloy of hardness D1 are deposited on and in proximity to the edges 88 and 99 of the worn thread 77 (the contours 771 and 772 of said beads are schematically represented in the form of curves partially in dotted lines);
- then a second metal alloy of hardness, D2 is deposited— the hardness D2 being significantly greater than the hardness D1—on the intermediate part 12 of the crown part of the thread delimited by the two beads 11 and 13 (the outer contour 773 of that intermediate part is shown in dotted lines);
- renovation of the thread 77 is completed by grinding the crown walls, as well as by making the welds flush on the side walls 55 and 66 of said thread, so as to obtain the shape and dimensions desired for said thread (contour 775 of that final shape is represented in solid lines in FIG. 2).

In practice, the metal beads are deposited on the crown part of the thread, notably, by TIG (Tungsten-Inert Gas) welding, or even with an MIG (Metal-Inert Gas) welding robot or by PTA (Plasma Transfer Arc) welding. The latter process of welding deposition makes it possible to obtain a very pure alloy, while limiting the phenomenon of dilution of the metal introduced in the base metal forming the thread.

Finally, it was found, on screws intended to turn always in the same direction, in order to perform the plasticization work and/or to extrude the plasticized material, that it was sufficient to cover the crown part of a screw thread solely in proximity to the leading edge of said part with a coating whose hardness is less than that of the coating on the rest of the crown part, including the other edge. Such solution is particularly valuable in the case of a narrow screw thread, that is, of width less than approximately 15 mm. The leading edge of a screw is understood to mean the edge closest to the outlet of the extruded material, said edge exerting the majority of the shear forces on the material to be plasticized.

We claim:

1. An extruder screw having at least one raised part forming a thread projecting on a core intended to be rotatably mounted inside an extruder roll for plasticizing a material and for extruding said material after plasticization, said raised part including a crown wall and side walls intersecting with the crown wall, the intersection between each of the side walls and the crown wall forming edges intended to cut the material during plasticization, the crown wall of said raised part being provided with a coating of at least two materials of different hardnesses D1 and D2 placed side by side on said crown wall.

2. An extruder screw according to claim 1, in which the coating material placed on and in proximity to at least one of the edges has a hardness D1 at least 5 HRc less than the hardness D2 of the second coating material.

3. An extruder screw according to claim 2, in which the coating material on and in proximity to said at least one edge has a hardness D1 equal at most to 52 HRc.

4. An extruder screw according to claim 1, in which the coating material placed on and in proximity to each edge has a hardness D1 at least 5 HRc less than the hardness D2 of the coating material covering the intermediate part of the crown of the thread situated between said edges.

5. An extruder screw according to claim 1, in which at least one of the coating materials is a nickel-base alloy.

6. An extruder screw according to claim 1, in which at least one of the coating materials is a tungsten-filled nickel-base alloy.

7. An extruder screw according to claim 1, in which at least one of the coating materials is a ceramic type material.

* * * * *